(12) United States Patent
Yanagisawa et al.

(10) Patent No.: US 7,018,600 B2
(45) Date of Patent: Mar. 28, 2006

(54) EXPANDED CARBON FIBER PRODUCT AND COMPOSITE USING THE SAME

(75) Inventors: Takashi Yanagisawa, Tokyo (JP); Morinobu Endo, 615 Kitahara-cho, Suzaka-shi, Nagano-ken (JP)

(73) Assignees: GSI Creos Corporation, Tokyo (JP); Morinobu Endo, Suzaka (JP)

( * ) Notice: Subject to any disclaimer, the term of this patent is extended or adjusted under 35 U.S.C. 154(b) by 411 days.

(21) Appl. No.: 10/098,440

(22) Filed: Mar. 18, 2002

(65) Prior Publication Data

US 2002/0136881 A1    Sep. 26, 2002

(30) Foreign Application Priority Data

Mar. 21, 2001  (JP) ............................... 2001-081738
Aug. 29, 2001  (JP) ............................... 2001-260410
Feb. 22, 2002  (JP) ............................... 2002-046780

(51) Int. Cl.
*D01F 9/12* (2006.01)
(52) U.S. Cl. ............... 423/447.1; 423/447.2; 423/447.3; 423/460; 428/367; 977/DIG. 1
(58) Field of Classification Search ............ 423/447.1, 423/447.2, 447.3, 445 R, 460
See application file for complete search history.

(56) References Cited

U.S. PATENT DOCUMENTS 4,895,713 A * 1/1990 Greinke et al. ............. 423/448
5,653,951 A * 8/1997 Rodriguez et al. .......... 423/439
5,780,101 A * 7/1998 Nolan et al. ................ 427/216

FOREIGN PATENT DOCUMENTS

| EP | 0 198 558 A2 | 10/1986 |
| EP | 1 122 344 A2 | 8/2001 |
| JP | A 2000-95947 | 4/2000 |
| WO | WO 91/01621 | 2/1991 |
| WO | WO 93/24214 | 12/1993 |

OTHER PUBLICATIONS

U.S. Appl. No. 10/098,375, filed Mar. 18, 2002, Yanagisawa et al.
U.S. Appl. No. 10/098,416, filed Mar. 18, 2002, Yanagisawa et al.
U.S. Appl. No. 10/098,351, filed Mar. 18, 2002, Yanagisawa et al.
U.S. Appl. No. 10/098,396, filed Mar. 18, 2002, Yanagisawa et al.

(Continued)

*Primary Examiner*—Stanley S. Silverman
*Assistant Examiner*—Peter J Lish
(74) *Attorney, Agent, or Firm*—Oliff & Berridge, PLC

(57) ABSTRACT

In an expanded carbon fiber product according to the present invention, a number of hexagonal carbon layers in the shape of a cup having no bottom are stacked. At least part of edges of the hexagonal carbon layers is exposed at an outer surface or inner surface of the expanded carbon fiber product. At least part of gaps between the hexagonal carbon layers is larger than the gaps between the hexagonal carbon layers at the time of vapor growth.

10 Claims, 15 Drawing Sheets

OTHER PUBLICATIONS

U.S. Appl. No. 10/098,440, filed Mar. 18, 2002, Yanagisawa et al.
U.S. Appl. No. 10/098,103, filed Mar. 18, 2002, Yanagisawa et al.
U.S. Appl. No. 10/098,522, filed Mar. 18, 2002, Yanagisawa et al.
U.S. Appl. No. 10/098,379, filed Mar. 18, 2002, Yanagisawa et al.
U.S. Appl. No. 10/098,312, filed Mar. 18, 2002, Yanagisawa et al.
U.S. Appl. No. 10/098,570, filed Mar. 18, 2002, Yanagisawa et al.

Terrones et al., "Graphic cones in palladium catalysed carbon nanofibres", Chemical Physics Letters, vol. 343, pp. 241-250, XP-002230244, 2001.

Endo et al., "Pyrolytic carbon nanotubes from vapor-grown carbon fibers", Applies Physics Letters, vol. 80, No. 7, pp 1267-1269, XP002230243, 2002.

Endo et al., "Structural characterization of cup-stacked-type nanofibers with an entirely hollow core", Applied Physics Letters, vol. 80, No. 7, Feb. 18, 2002, pp. 1267-1269.

Kim et al., "Effect of ball milling on morphology of cup-stacked carbon nanotubes", Chemical Physics Letters, Apr. 2, 2002.

* cited by examiner

EXPANDED CARBON FIBER PRODUCT AND COMPOSITE USING THE SAME

Japanese Patent Application No. 2001-81738 filed on Mar. 21, 2001, Japanese Patent Application No. 2001-260410 filed on Aug. 29, 2001, and Japanese Patent Application No. 2002-46780 filed on Feb. 22, 2002 are hereby incorporated by reference in their entirety.

BACKGROUND OF THE INVENTION

The present invention relates to an expanded carbon fiber product and a composite using the same.

A vapor grown carbon fiber generally has a structure in which hexagonal carbon layers are stacked concentrically.

Expanded graphite in which the gaps between graphite layers are increased is known and used for various types of applications.

However, since the hexagonal carbon layers are stacked concentrically in the vapor grown carbon fiber, the edges of each layer are exposed only on opposite ends of the fiber.

Therefore, it is difficult to cause sulfuric acid or the like to be introduced between the hexagonal carbon layers of the above carbon fiber, thereby making it difficult to form a structure similar to that of expanded graphite.

BRIEF SUMMARY OF THE INVENTION

The present invention has been achieved to solve the above-described problems. The present invention may provide an expanded carbon fiber product which allows the gaps between hexagonal carbon layers to be larger than the gaps at the time of vapor growth and can be used for various types of applications, and a composite using the same.

In order to solve the above problems, the present invention provides an expanded carbon fiber product comprising a vapor grown coaxial stacking morphology of truncated conical tubular graphene layers, wherein each of the truncated conical tubular graphene layers includes a hexagonal carbon layer and has a large ring end at one end and a small ring end at the other end in an axial direction, wherein at least part of edges of the hexagonal carbon layers are exposed at the large ring ends, and wherein at least part of gaps between the hexagonal carbon layers is larger than the gaps between the hexagonal carbon layers at the time of vapor growth.

In the present invention, the edges of the hexagonal carbon layers are exposed. The exposed edges have an extremely high activity and exhibit good affinity to various types of materials. Therefore, the expanded carbon fiber product may be suitably used as a support for catalytic metal or the like. The expanded carbon fiber product may be used as a carbon intercalation compound in which various types compounds are intercalated into the gaps between the hexagonal carbon layers which have become larger than the gaps at the time of vapor growth. A composite excelling in strength can be provided by mixing the expanded carbon fiber product with a resin material or a metal material. The expanded carbon fiber product may be used for various types of applications such as an anode material or additive to the anode material of primary and secondary lithium batteries, members of fuel cells (high-polymer electrolyte membrane, catalyst support, separator, and the like).

The expanded carbon fiber product of the present invention may have a bulk density of 0.010 $g/cm^3$ or less. Therefore, the expanded carbon fiber product has an increased porosity and may excel in hydrogen storage capability.

In the present invention, at least part of the gaps between the hexagonal carbon layers may be 100 to 1000 times larger than the gaps between the hexagonal carbon layers at the time of vapor growth.

In the present invention, the coaxial stacking morphology of the truncated conical tubular graphene layers may have a structure in which one to several tens of thousands of the hexagonal carbon layers are stacked.

In the present invention, catalytic metal may be supported on the edges of the hexagonal carbon layers. At least part of the hexagonal carbon layers may be exposed at the small ring ends, and the catalytic metal may be supported on the exposed edges of the hexagonal carbon layers.

Since the vapor-grown carbon fiber has a minute diameter of several nanometers to several tens of nanometers, the surface area of the carbon fiber at a specific weight (surface area on which catalytic metal can be supported in a state capable of exhibiting catalytic effect) is considerably greater than that of carbon black. Therefore, the amount of catalytic metal to be supported is increased, whereby the catalytic effect is increased. In other words, in the case of using carbon black, part of the supported catalytic metal is incapable of exhibiting the catalytic effect. In the case of using the expanded carbon fiber product of the present invention, an effect same as the catalytic effect in the case of using carbon black can be obtained even if the amount of catalytic metal is smaller.

DETAILED DESCRIPTION OF THE EMBODIMENT

One embodiment of the present invention is described below in detail with reference to the drawings.

A vapor grown carbon fiber is a short fiber in which carbon obtained by pyrolysis of hydrocarbons such as benzene or methane at a temperature of about 700° C. to 1000° C. is grown with a catalyst particle such as an ultra-fine iron particle or nickel as a nucleus.

Carbon fibers generally have a structure in which the hexagonal carbon layers are grown concentrically or a structure in which the hexagonal carbon layers are grown in an axial direction of the fiber. However, depending upon the vapor growth conditions such as catalyst, temperature range, and flow rate, carbon fibers may have a herring-bone structure in which the stacked hexagonal carbon layers are tilted with respect to the fiber axis at a specific angle.

Carbon fibers with a herring-bone structure generally have a structure in which a number of hexagonal carbon layers in the shape of a cup having a bottom are stacked. However, the vapor-grown carbon fiber according to one embodiment of the present invention has a structure in which a number of hexagonal carbon layers in the shape of a cup having no bottom are stacked (this bottomless carbon fiber is hereinafter called "carbon fiber having a herring-bone structure").

Figure 15:
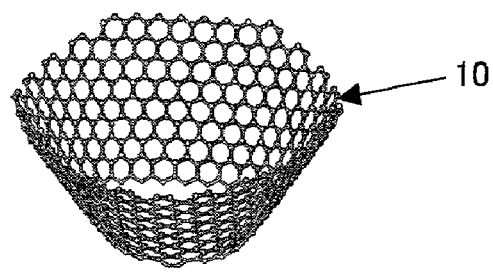
FIG. 15 is a computer graphic showing a hexagonal carbon layer, which is a unit of the coaxial stacking morphology of the truncated conical tubular graphene layers shown in FIG. 14, based on rigorous quantum theoretical calculation.
Figure 14:
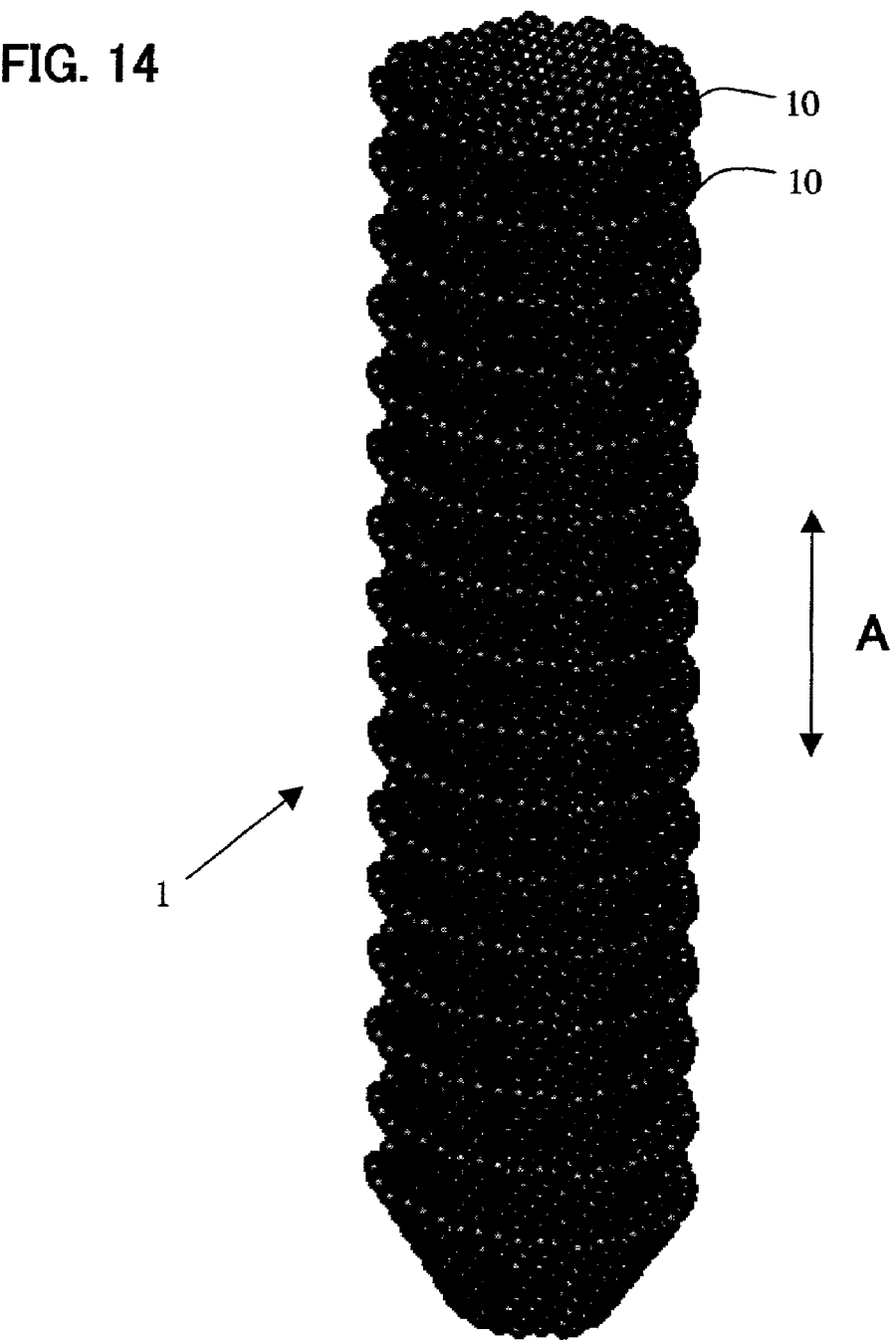
FIG. 14 is a computer graphic showing a coaxial stacking morphology of truncated conical tubular graphene layers based on rigorous quantum theoretical calculation.

Specifically, this carbon fiber 1 has a coaxial stacking morphology of truncated conical tubular graphene layers shown by a computer graphic in FIG. 14. Each of the truncated conical tubular graphene layers is formed of a hexagonal carbon layer 10 shown in FIG. 15. Although the actual hexagonal carbon layers 10 shown in FIG. 14 are stacked densely in an axial direction A, they are stacked roughly in FIG. 14 for convenience of description.

Figure 16:
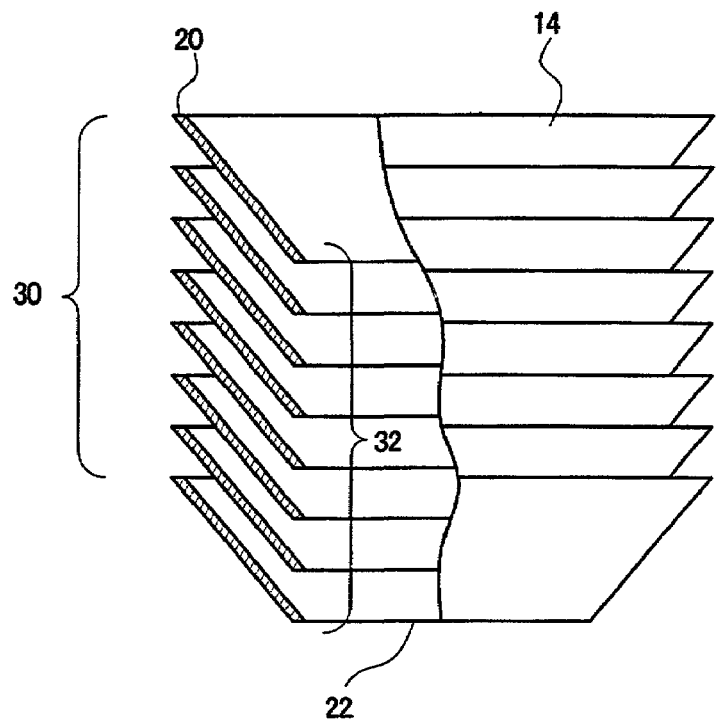
FIG. 16 is a schematic view of a large ring end and a small ring end which respectively form an outer surface and an inner surface of the coaxial stacking morphology of truncated conical tubular graphene layers.

FIG. 16 is a schematic view of FIG. 14. Each of the hexagonal carbon layers 10 has a large ring end 20 at one end and a small ring end 22 at the other end in the axial direction. An outer surface 30 of the carbon fiber 1 is formed of the large ring ends 20 stacked in the axial direction A. An inner surface 32 of the carbon fiber 1 is formed of the small ring ends 22 stacked in the axial direction A. The carbon fiber 1 is thus in the shape of a hollow core with no bridge and has a center hole 14.

An example of a method of manufacturing the carbon fiber 1 shown in FIG. 14 is described below.

A conventional vertical type reactor was used.

Benzene as a raw material was fed to a chamber of the reactor using a hydrogen stream at a flow rate of 0.3 l/h and a partial pressure equivalent to the vapor pressure at about 20° C. Ferrocene as a catalyst was vaporized at 185° C. and fed to the chamber at a concentration of about $3 \times 10^{-7}$ mol/s. The reaction temperature and the reaction time were about 1100° C. and about 20 minutes, respectively. As a result, a carbon fiber having a herring-bone structure with an average diameter of about 100 nenometers was obtained. A hollow carbon fiber having no bridge at a length ranging from several tens of nanometers to several tens of microns, in which a number of hexagonal carbon layers in the shape of a cup having no bottom are stacked, is obtained by adjusting the flow rate of the raw material and the reaction temperature (which are changed depending on the size of the reactor).

Figure 1:
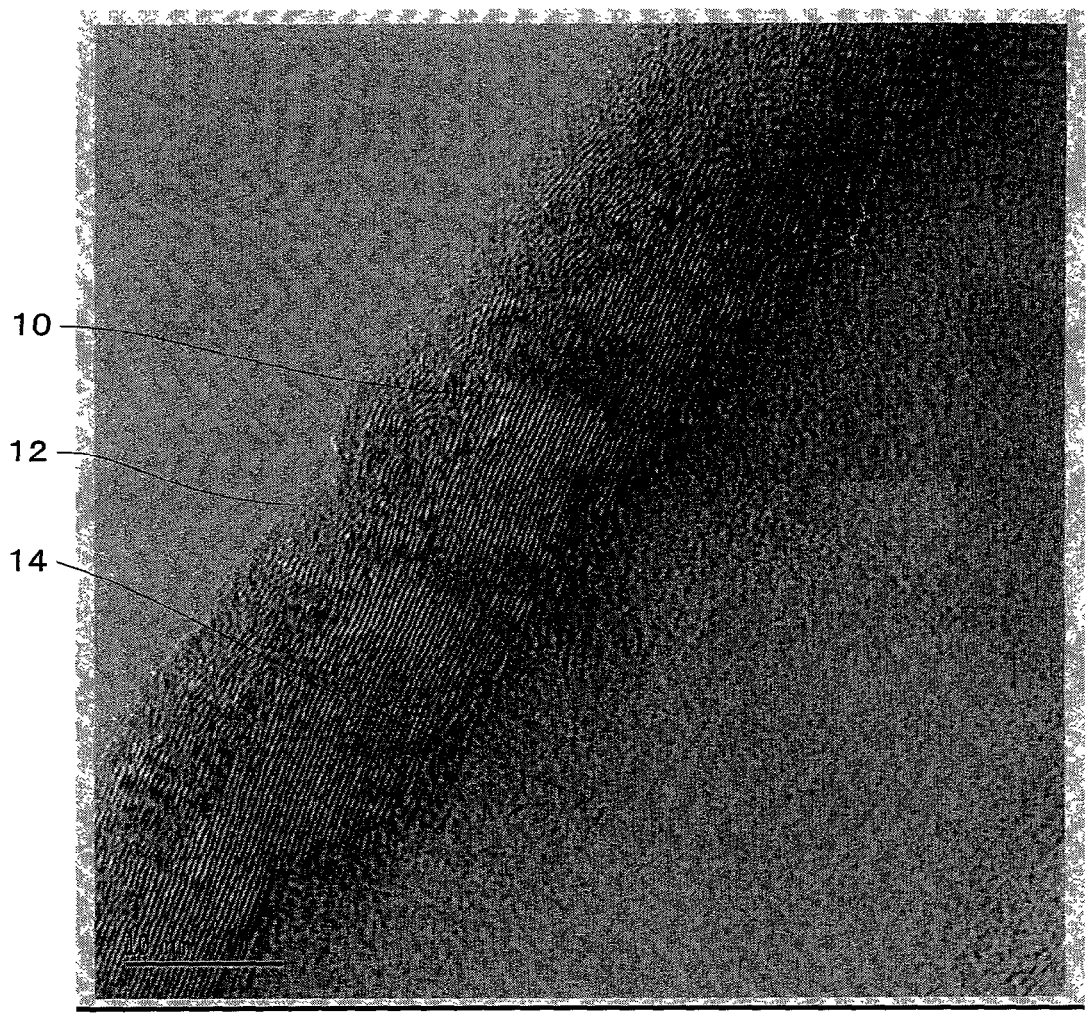
FIG. 1 is a copy of a transmission electron micrograph showing a carbon fiber having a herring-bone structure manufactured by a vapor growth process.
Figure 2:
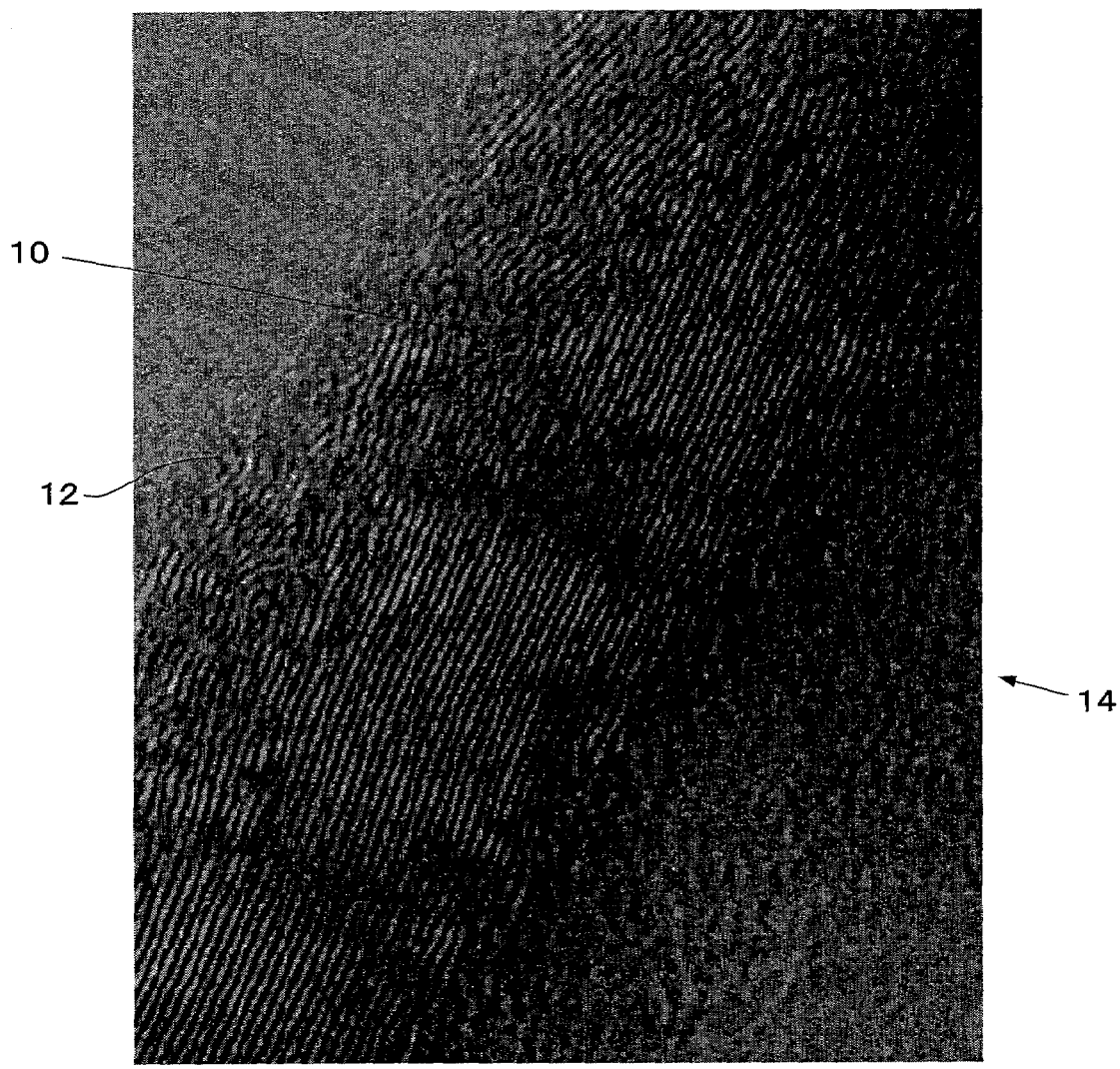
FIG. 2 is a copy of an enlarged micrograph of FIG. 1.
Figure 3:
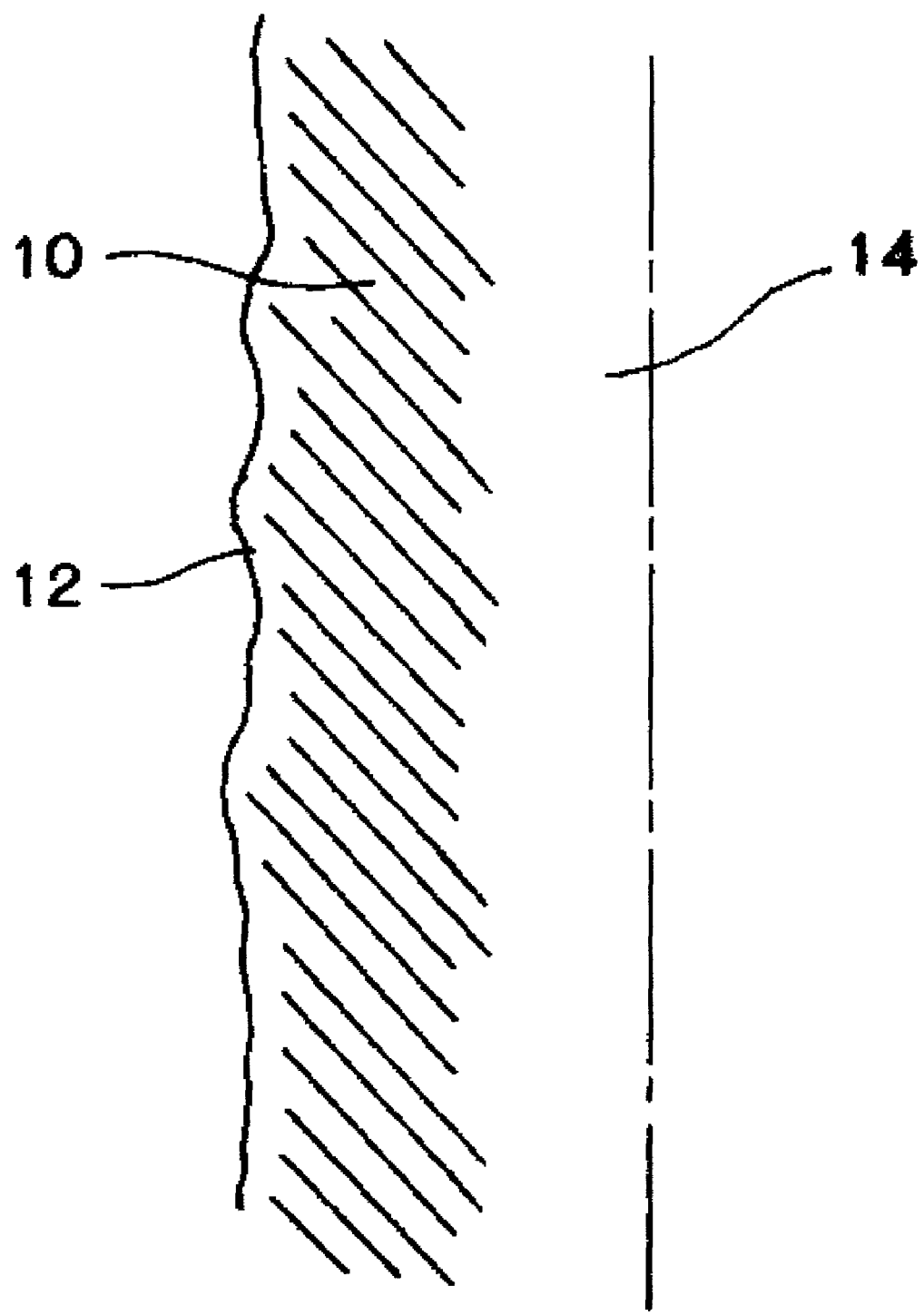
FIG. 3 is a schematic view of FIG. 2.

FIG. 1 is a copy of a transmission electron micrograph showing the carbon fiber having a herring-bone structure manufactured by the vapor growth process. FIG. 2 is a copy of an enlarged micrograph of FIG. 1, and FIG. 3 is a schematic view of FIG. 2.

As is clear from these figures, a deposited layer 12, in which an excess amount of amorphous carbon is deposited, is formed to cover the tilted hexagonal carbon layers 10. The thickness of the deposited layer 12 is about several nanometers. A reference numeral 14 indicates the center hole.

Figure 17:
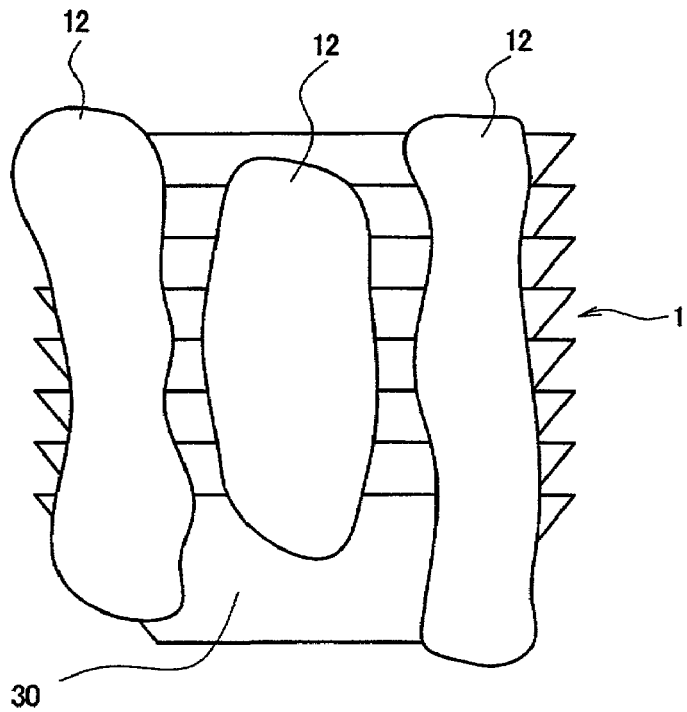
FIG. 17 is a schematic view of a deposited film of pyrolytic carbon formed over a wide range of an outer surface of a carbon fiber.

FIG. 17 is a schematic view showing a state in which the deposited films 12 are formed over a wide area of the outer surface 30 of the carbon fiber 1. As shown in FIG. 17, the hexagonal carbon layers 10 are exposed on the large ring ends 20 in the areas in which the outer surface of the carbon fiber 1 is not covered with the deposited films 12. These areas have a high activity. In the area in which the inner surface of the carbon fiber 1 is not covered with the deposited films 12, the hexagonal carbon layers 10 are exposed on the exposed small ring ends 22.

The deposited layers 12 are oxidized and pyrolyzed by heating the carbon fiber on which the deposited layers 12 are formed at a temperature of 400° C. or more, preferably 500° C. or more, and still more preferably 520° C. to 530° C. for one to several hours in air. As a result, the deposited layers 12 are removed, whereby the edges of the hexagonal carbon layers are further exposed.

The deposited layers 12 may be removed by washing the carbon fiber with supercritical water, whereby the edges of the hexagonal carbon layers are exposed.

The deposited layers 12 may be removed by immersing the carbon fiber in hydrochloric acid or sulfuric acid and heating the carbon fiber at about 80° C. while stirring using a stirrer.

Figure 4:
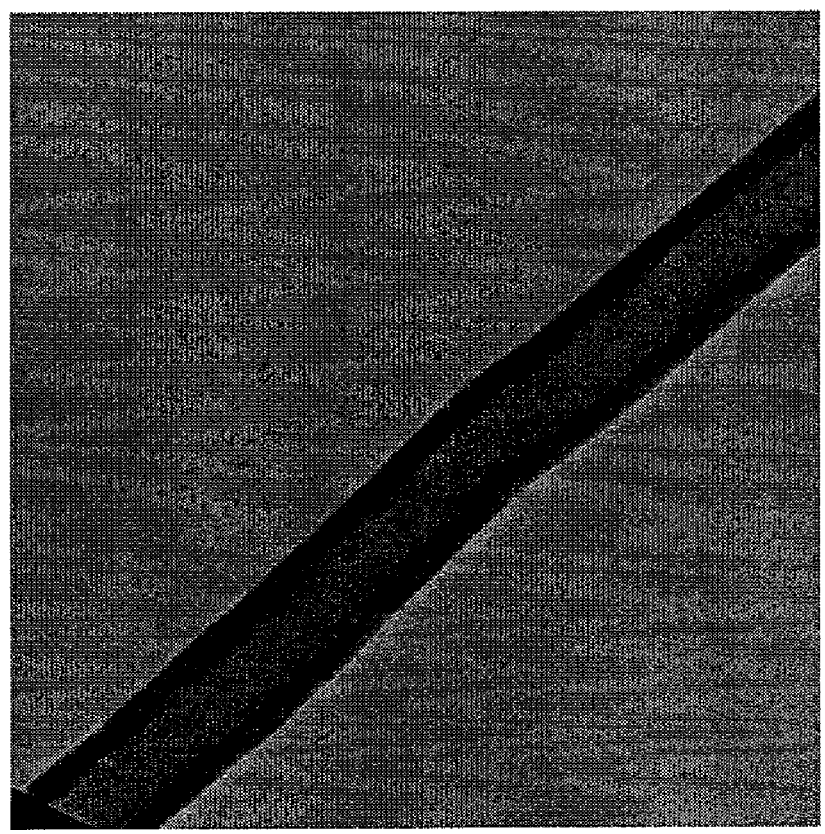
FIG. 4 is a copy of a transmission electron micrograph showing a carbon fiber having a herring-bone structure heated at a temperature of about 530° C. for one hour in air.
Figure 5:
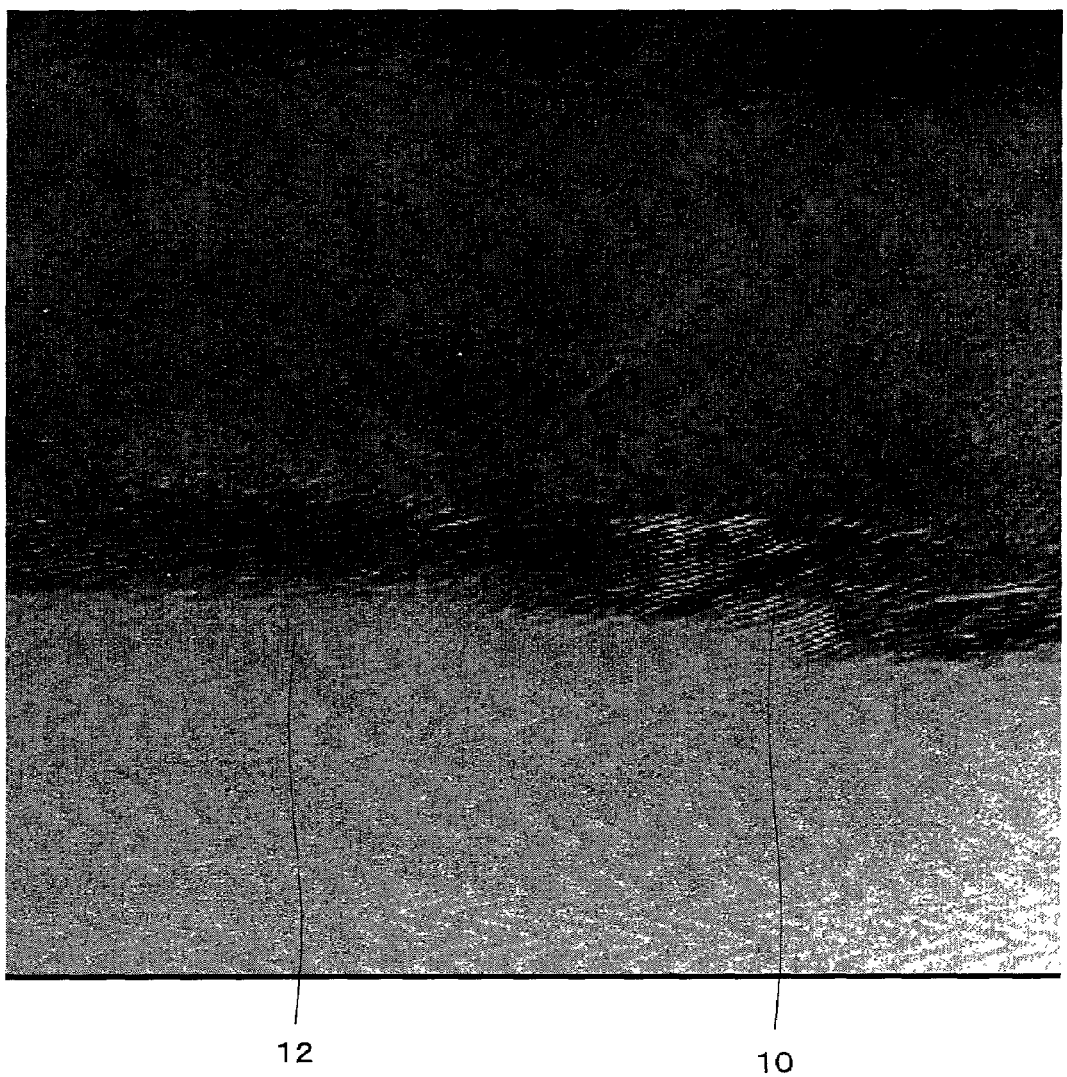
FIG. 5 is a copy of an enlarged micrograph of FIG. 4.

FIG. 4 is a copy of a transmission electron micrograph showing the carbon fiber having a herring-bone structure heated at a temperature of about 530° C. for one hour in air. FIG. 5 is a copy of an enlarged micrograph of FIG. 4, FIG. 6 is a copy of an enlarged micrograph of FIG. 5, and FIG. 7 is a schematic view of FIG. 6.

Figure 6:
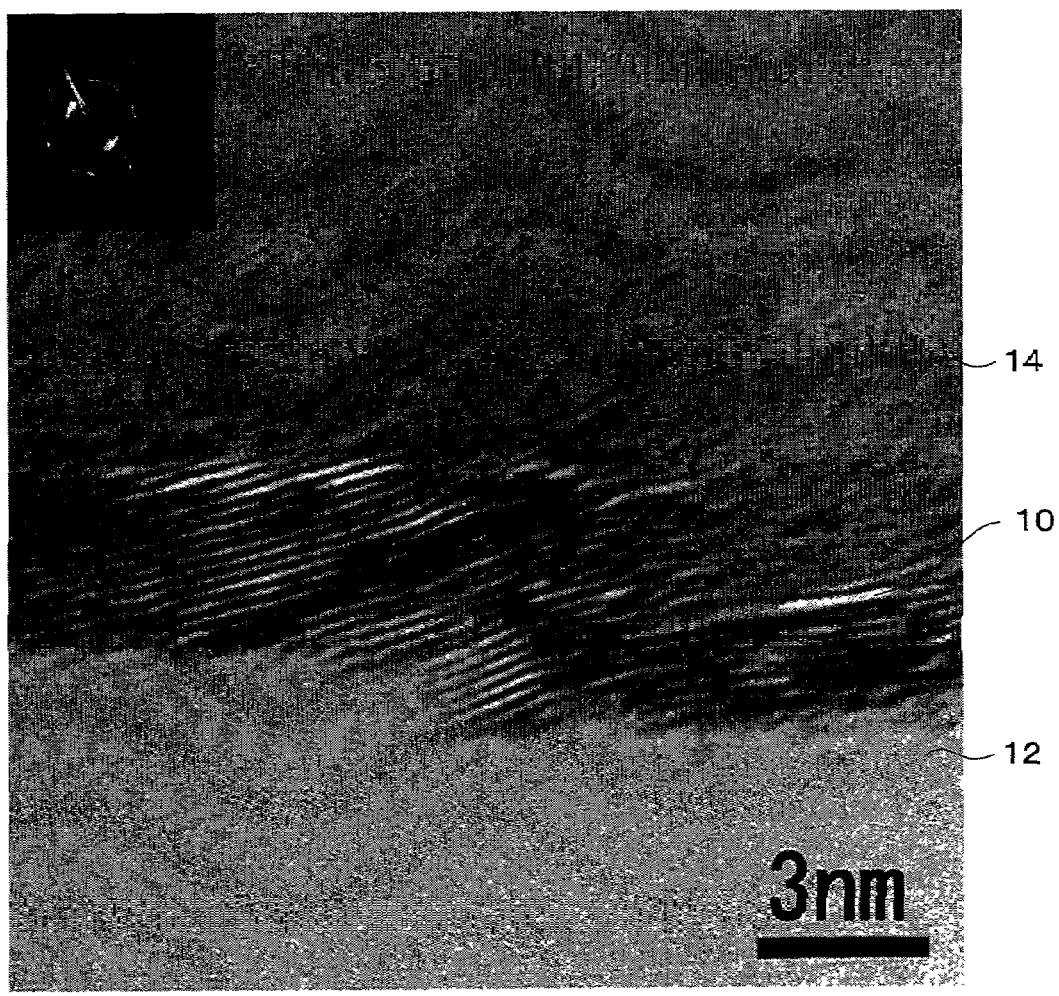
FIG. 6 is a copy of an enlarged micrograph of FIG. 5.
Figure 7:
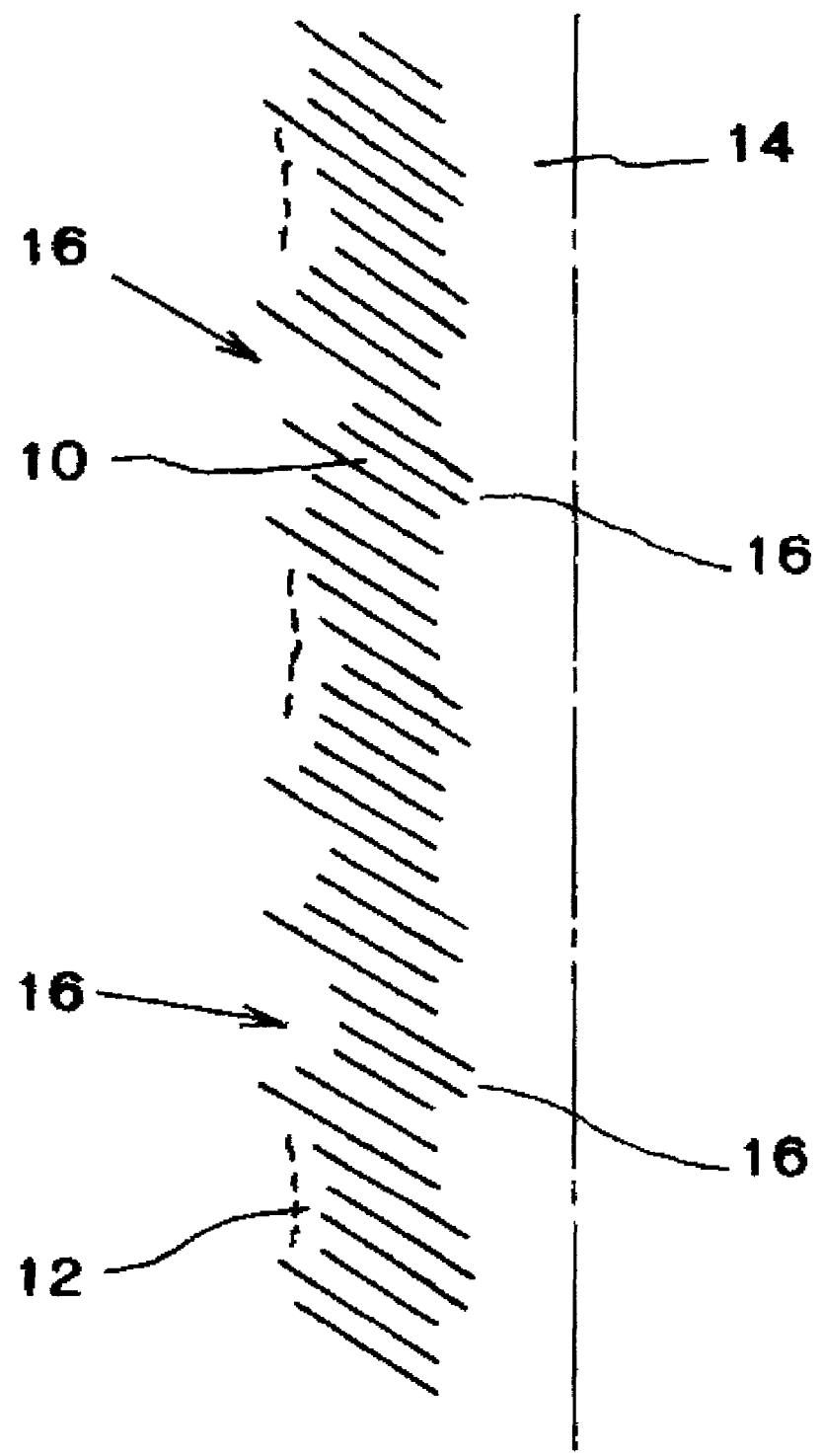
FIG. 7 is a schematic view of FIG. 6.

As is clear from FIGS. 5 to 7, part of the deposited layers 12 is removed by performing a heat treatment or the like, whereby the edges of the hexagonal carbon layers 10 are further exposed. The residual deposited layers 12 are considered to be almost pyrolyzed and merely attached to the carbon fiber. The deposited layers 12 can be removed completely by combining heat treatment for several hours and washing with supercritical water.

As is clear from FIG. 4, the carbon fiber 1 in which a number of hexagonal carbon layers 10 in the shape of a cup having no bottom are stacked is hollow at a length ranging at least from several tens of nanometers to several tens of microns.

The tilt angle of the hexagonal carbon layers with respect to the center line is from about 25° to 35°.

As is clear from FIGS. 6 and 7, the edges of the hexagonal carbon layers 10 on the outer surface and the inner surface are irregular in the area in which the edges of the hexagonal carbon layers 10 are exposed, whereby minute irregularities 16 at a nanometer (nm) level, specifically, at the level atoms are formed. The irregularities 16 are unclear before removing the deposited layers 12 as shown in FIG. 2. However, the irregularities 16 appear by removing the deposited layers 12 by the heat treatment.

The exposed edges of the hexagonal carbon layers 10 have an extremely high activity and easily bond to other atoms. The reasons therefor are considered to be as follows. The heat treatment in air causes the deposited layers 12 to be removed and the amount of functional groups containing oxygen such as a phenolic hydroxyl group, carboxyl group, quinone type carbonyl group, and lactone group, to be increased on the exposed edges of the hexagonal carbon layers 10. These functional groups containing oxygen have high hydrophilicity and high affinity to various types of substances.

Figure 8:
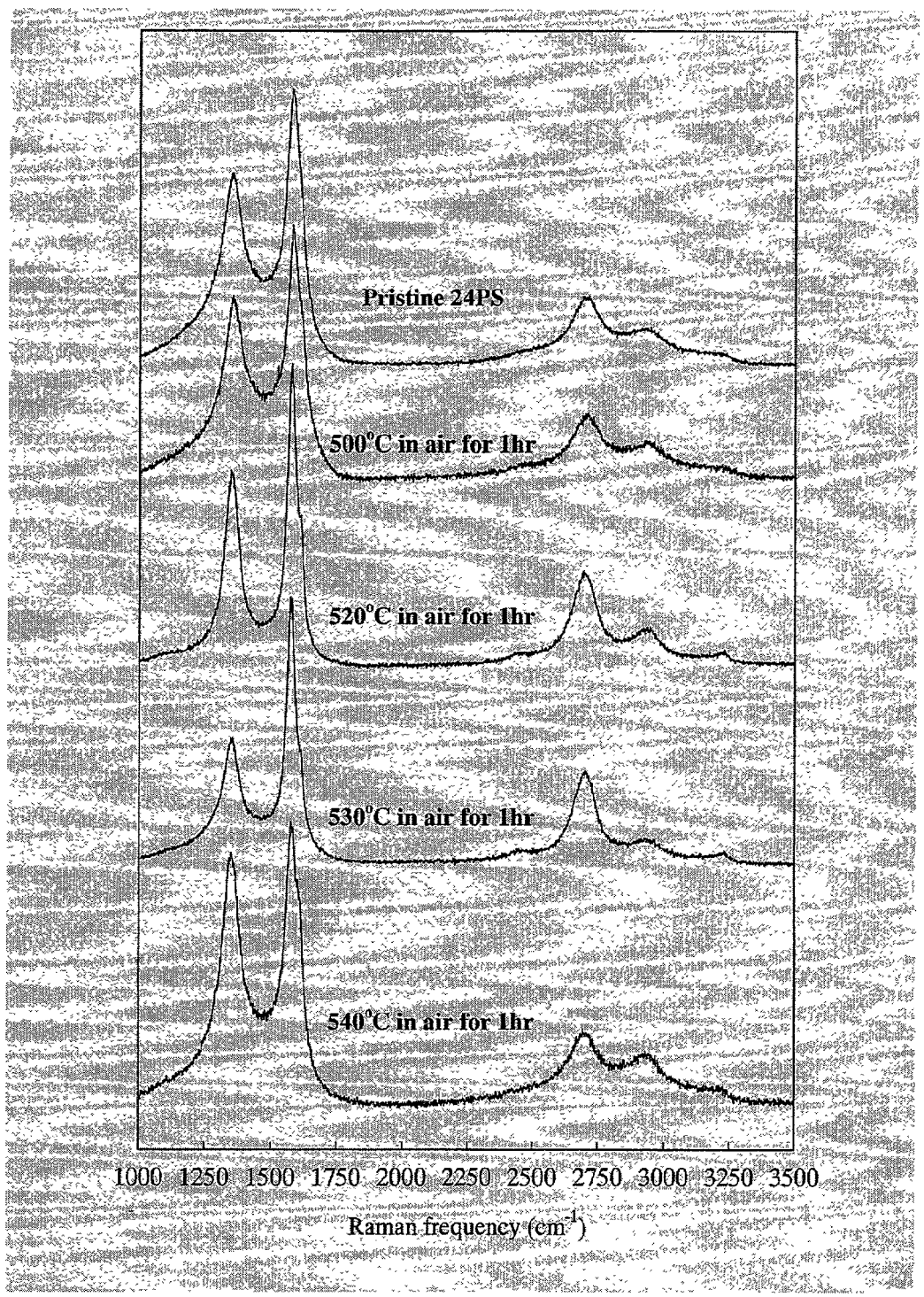
FIG. 8 is a characteristic chart showing the Raman spectra of a carbon fiber having a herring-bone structure (sample No. 24PS) after heating at 500° C., 520° C., 530° C., and 540° C. for one hour in air.

FIG. 8 shows the Raman spectra of a carbon fiber having a herring-bone structure (sample No. 24PS) after heating at 500° C., 520° C., 530° C., and 540° C. for one hour in air.

FIGS. 5 to 7 show that the deposited layers 12 are removed by the heat treatment. As is clear from the Raman spectra shown in FIG. 8, the presence of the D peak (1360 $cm^{-1}$) and the G peak (1580 $cm^{-1}$) shows that this sample is a carbon fiber and has no graphitized structure.

Specifically, the carbon fiber having a herring-bone structure is considered to have a turbostratic structure in which the carbon layers are disordered.

This carbon fiber has a turbostratic structure in which the hexagonal carbon layers are stacked in parallel but are shifted in the horizontal direction or rotated. Therefore, the carbon fiber has no crystallographic regularity.

The feature of this turbostratic structure is that intercalation of other atoms or the like seldom occurs. This is one of the advantages. Specifically, atoms or the like are easily supported on the exposed edges of the hexagonal carbon layers having a high activity, since the substances are scarcely intercalated. Therefore, the carbon fiber functions as an efficient support.

Figure 9:
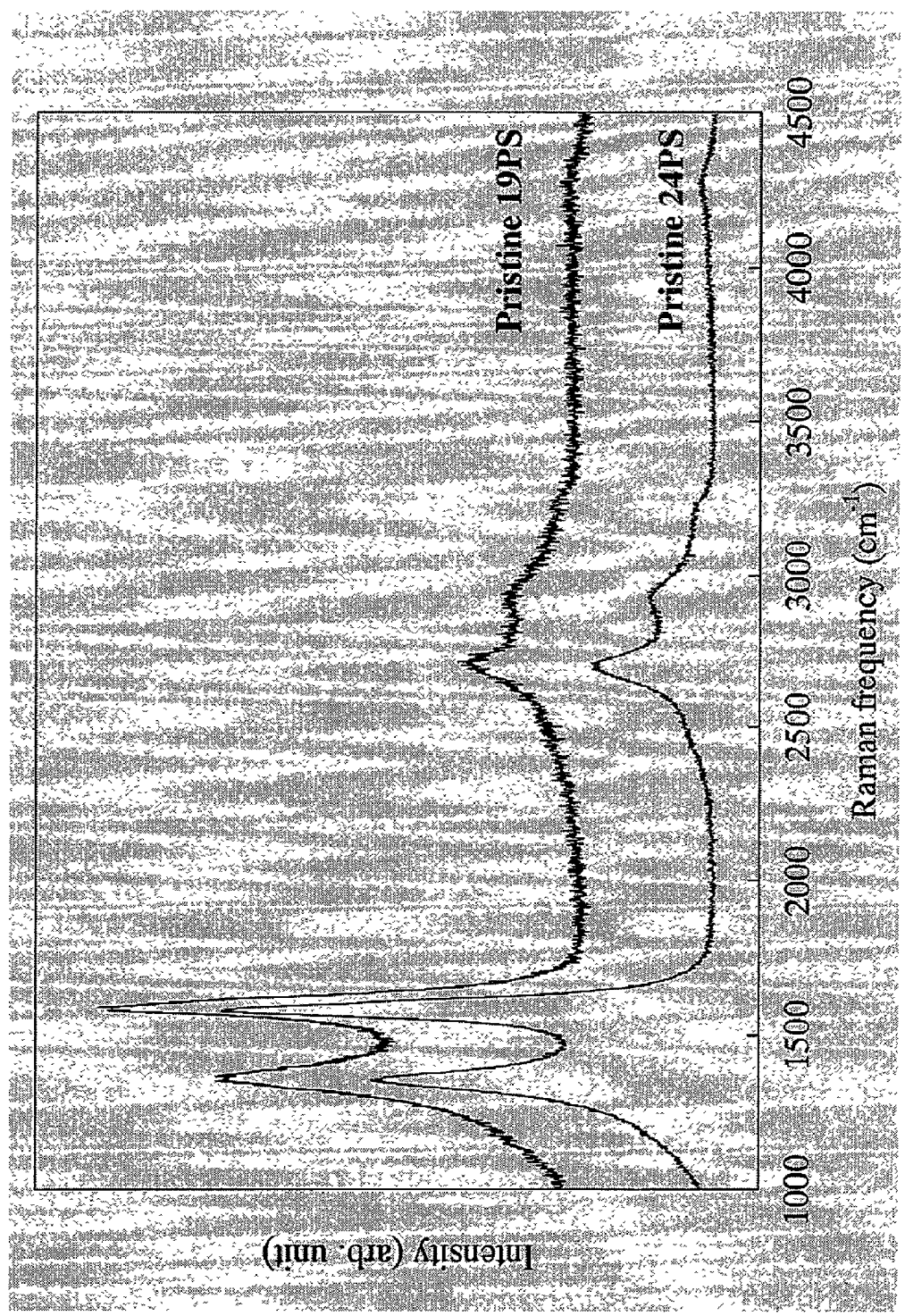
FIG. 9 is a characteristic chart showing the Raman spectra of carbon fiber samples No. 19PS and No. 24PS in which edges of hexagonal carbon layers are exposed by the above heat treatment.

FIG. 9 shows the Raman spectra of carbon fiber samples No. 19PS and No. 24PS in which the edges of the hexagonal carbon layers are exposed by the above heat treatment.

Figure 10:
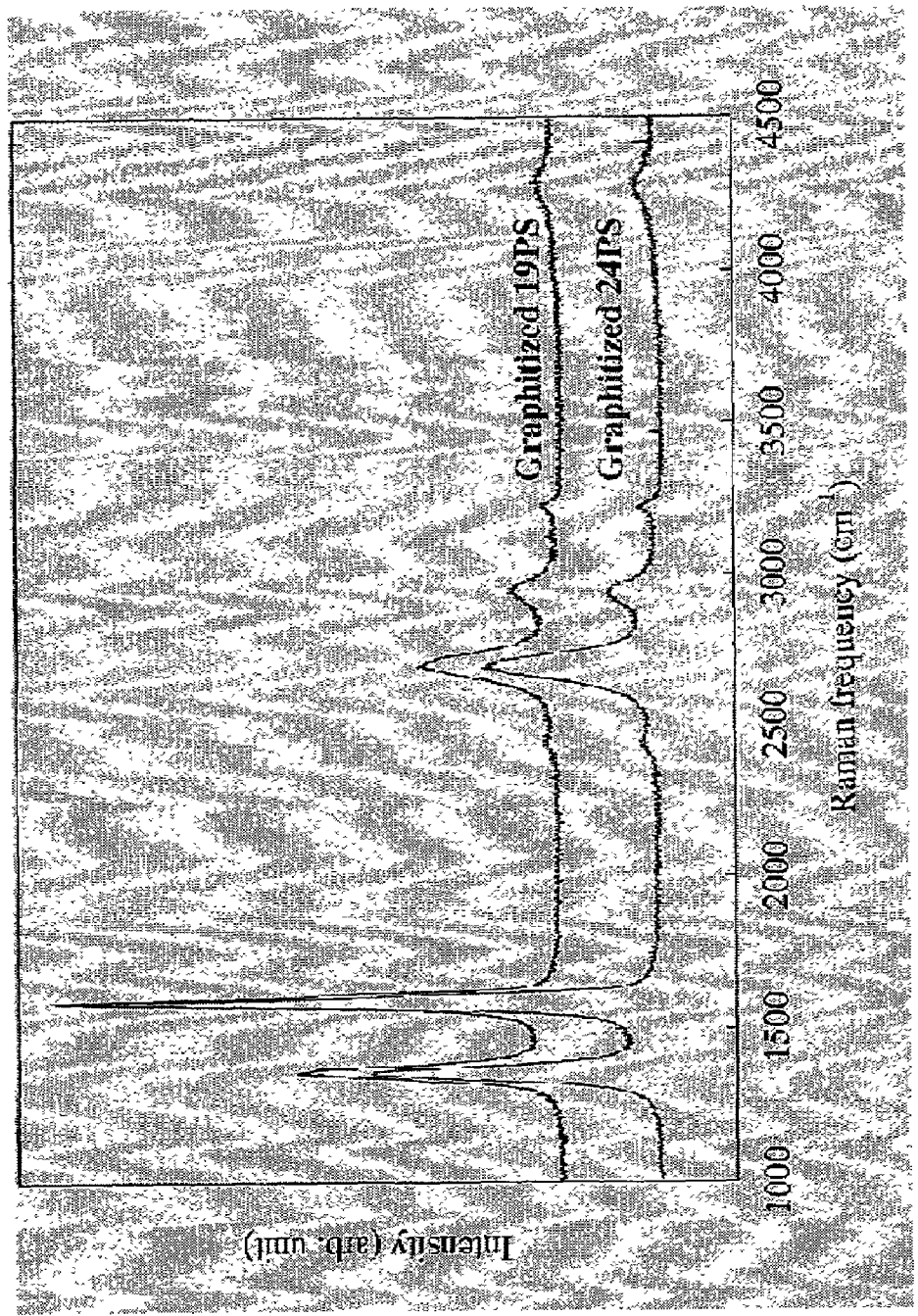
FIG. 10 is a characteristic chart showing the Raman spectra of the carbon fiber samples No. 19PS and No. 24PS, heated at 3000° C. after the edges of the hexagonal carbon layers has been exposed.

FIG. 10 shows the Raman spectra of the carbon fiber samples No. 19PS and No. 24PS, heated at 3000° C. (common graphitization treatment) after the edges of the hexagonal carbon layers has been exposed.

As shown in FIG. 10, the D peak does not disappear even if the carbon fiber in which the edges of the hexagonal carbon layers are exposed is subjected to the graphitization treatment. This means that the carbon fiber is not graphitized by the graphitization treatment.

A diffraction line did not appear at the 112 plane in X-ray diffractometry (not shown). This also shows that the carbon fiber was not graphitized.

It is considered that the carbon fiber is not graphitized by the graphitization treatment because the deposited layers 12, which are easily graphitized, have been removed. This also shows that the remaining portions of the herring-bone structure are not graphitized.

An expansion treatment of the carbon fiber is described below.

The carbon fiber in which the edges of the hexagonal carbon layers are exposed was immersed in 98% concentrated sulfuric acid, thereby causing the concentrated sulfuric acid to be introduced between the hexagonal carbon layers.

The carbon fiber was heated instantaneously at 500° C. to 700° C. As a result, the concentrated sulfuric acid was gasified instantaneously, whereby the gaps between the hexagonal carbon layers were increased due to the expansion pressure. The carbon fiber was washed with water to remove residual sulfuric acid. The carbon fiber was then dried under vacuum to obtain an expanded carbon fiber product.

Expanded carbon fiber products were also obtained in the case of using a bromine solution, fuming nitric acid, or a tetrahydrofuran (THF)-potassium solution instead of using concentrated sulfuric acid.

Figure 11:
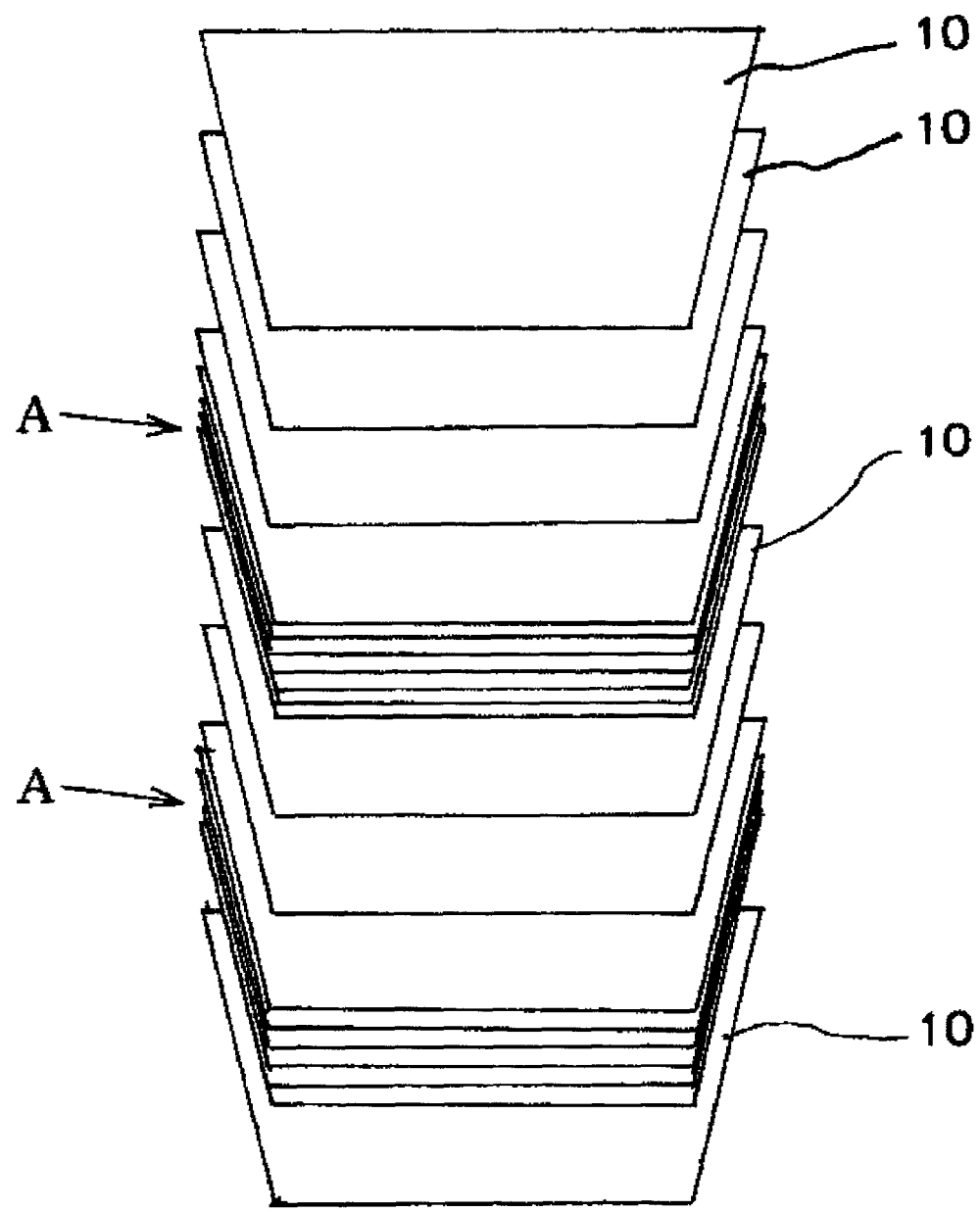
FIG. 11 is a schematic view showing an expanded carbon fiber product.

FIG. 11 is a schematic view showing the obtained expanded carbon fiber product.

As is clear from FIG. 11, the gaps between the bottomless cup-shaped, specifically, truncated conical tubular hexagonal carbon layers 10 are increased in comparison with the gaps at the time of the vapor growth. These hexagonal carbon layers 10, between which the gaps are increased, are partly bond to each other and are not separated completely. The gaps between some of the hexagonal carbon layers are not increased as indicated by a region A. The resulting carbon fiber products have various lengths. For example, some carbon fiber products are formed of one hexagonal carbon layer 10 which is completely separated from others, and another carbon fiber products have a structure in which the gaps between layers are increased and several hexagonal carbon layers 10 are bonded to one another. The carbon fiber products are generally formed of one to several tens of thousands of the hexagonal carbon layers 10 bonded to one another.

The gaps between the hexagonal carbon layers 10 are generally 3.54 Å. However, the gaps have been increased by about 100 to 1000 times by the expansion treatment.

The exposed edges of the hexagonal carbon layers 10 of the carbon fiber having the above properties easily bond to other atoms and have extremely high activity.

A carbon fiber having catalytic metal supported thereon has been manufactured using this carbon fiber.

An example of a manufacturing method is described below.

1. The above carbon fiber was mixed in a solution of ethanol and chloroplatinic acid. The mixture was stirred for one hour.

2. An aqueous solution of sodium borohydride was added to the above mixture to reduce chloroplatinic acid.

3. After one minute of reduction treatment, an aqueous solution of hydrochloric acid was added to the mixture to decompose an excessive amount of sodium borohydride.

4. After five minutes, a carbon fiber on which catalytic metal was supported was removed by filtration.

5. After filtration, the carbon fiber was immersed in an aqueous solution of ammonium bicarbonate to neutralize the catalytic metal, and then washed with purified water.

6. After removing water, the mixture was dried under vacuum to obtain a carbon fiber on which catalytic platinum metal was supported.

Figure 12:
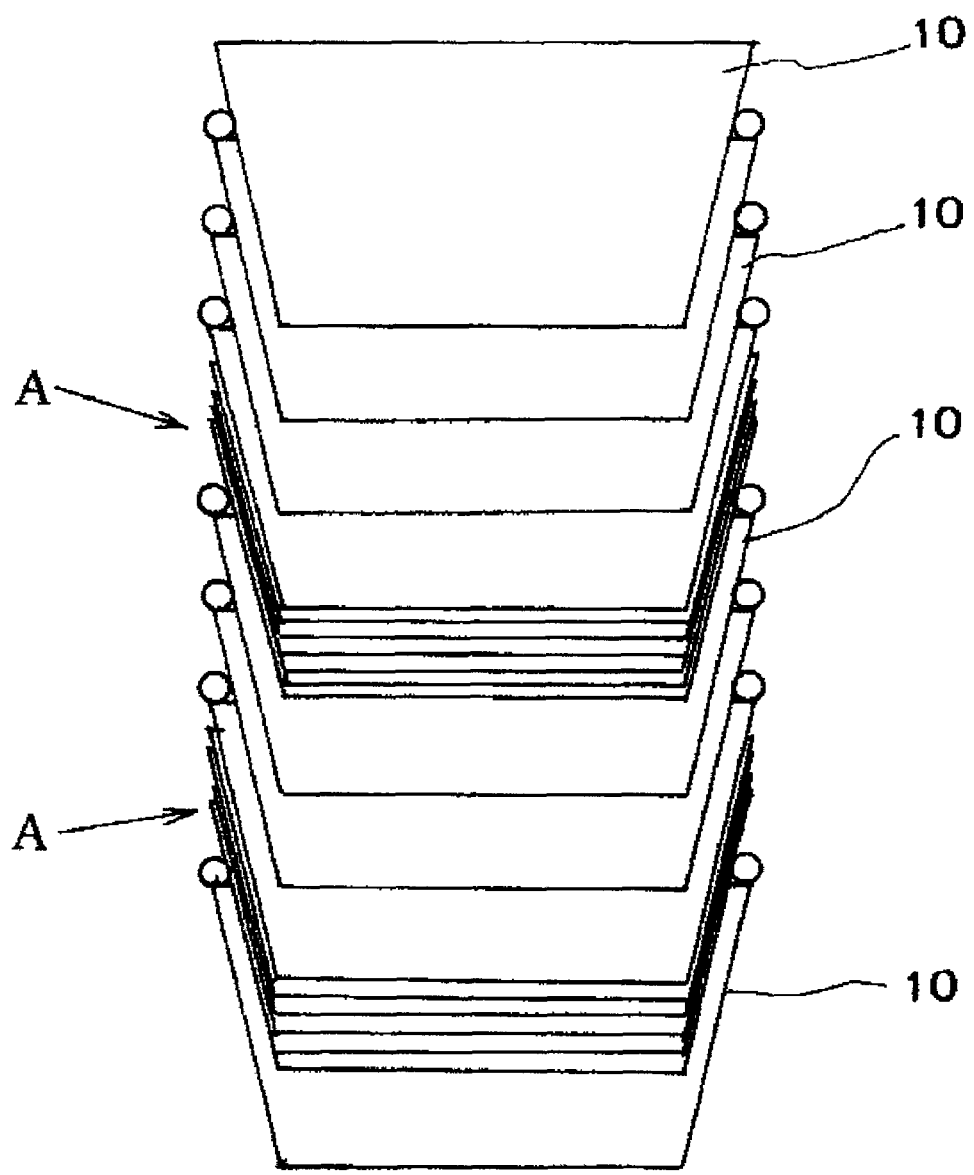
FIG. 12 is a schematic view showing a state in which catalytic metal (platinum) is supported on the expanded carbon fiber product.

FIG. 12 is a schematic view showing a state of the expanded carbon fiber product on which the catalytic metal (platinum) is supported.

The size of platinum atoms is about 30 Å. The platinum atoms are supported on the exposed edges (edges on outer surface and inner surface) of the hexagonal carbon layers 10.

The platinum atoms are supported on these ring-shaped edges continuously in a chain configuration.

Since the expanded carbon fiber product has an extremely minute diameter of about 100 nm, a large number of platinum metal particles are supported, whereby the catalytic effect is remarkable.

The expanded carbon fiber product on which the catalytic platinum metal is supported may be suitably used as a catalyst for fuel cells or the like. The expanded carbon fiber product may be used as a catalyst not only for fuel cells but also for other applications.

The expanded carbon fiber product may be used as a support for catalytic metal such as platinum alloy, ruthenium, or palladium in addition to platinum.

The exposed edges of the hexagonal carbon layers 10 have an extremely high activity. In addition, the hollow structure and the irregularities 16 contribute to anchoring effects to a large extent. Therefore, composites excelling in strength can be obtained by mixing the expanded carbon fiber product with various types of base materials.

In the case where composites are manufactured by mixing the expanded carbon fiber product with resin materials such as polyethylene, polypropylene, nylon, fluororesins such as FEP, PFA, and PTFE, polyesters, polyimides, and polycarbonates, the strength of these composites is improved remarkably.

The expanded carbon fiber product may be mixed not only with the resin materials but also with metal materials such as aluminum, copper, and magnesium with good adhesion.

Figure 13:
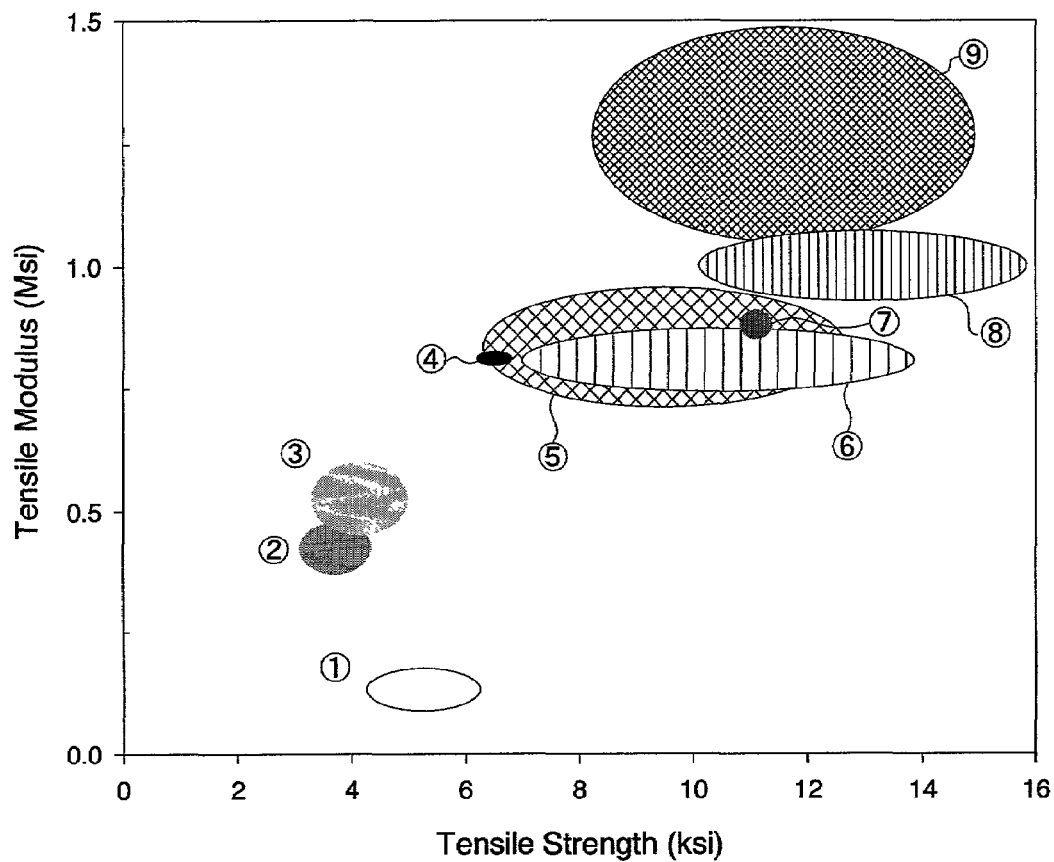
FIG. 13 is a characteristic chart showing tensile strength (horizontal axis) and tensile modulus (vertical axis) of various types of composites.

FIG. 13 shows tensile strength (horizontal axis) and tensile modulus (vertical axis) of composites in which reinforcing fibers or various types of fillers are mixed with polypropylene (base material). The case of mixing 30 wt % of an untreated herring-bone carbon fiber is denoted by ④, and the case of mixing 30 wt % of the above carbon fiber in which the deposited layers are removed by the heat treatment is denoted by ⑦.

As is clear from the figure, composites containing the carbon fiber have strength comparable to composites in which a glass fiber is mixed. In the case of mixing the carbon fiber in which the edges of the hexagonal carbon layers are exposed by removing the deposited layers (⑦), the tensile strength is improved remarkably and the tensile modulus is improved moderately in comparison with the case of mixing the untreated herring-bone carbon fiber (④).

Generally, when the carbon fiber is mixed with a base material such as a resin material, the carbon fiber tends to break during mixing. Therefore, a large amount (10 wt % or more) of carbon fiber is mixed in order to improve the performance. However, since the carbon fiber product of the present invention has good adhesion to base materials such as resins, it suffices that the amount of carbon fiber be in the range from 0.1 wt % or more to 10 wt % or less (preferably about 0.3 wt % ) in terms of strength.

Moreover, the expanded carbon fiber product having a herring-bone structure is deformed in the shape of the letter "S", the letter "Z", or a spiral due to external force applied during mixing and fits the base material. Therefore, a good twining effect is expected. Specifically, the carbon fiber has characteristics by which the carbon fiber seldom breaks and is easily bent, soft, twisted, rotated, and the like. These characteristics are obtained even if the deposited layers 12 are not removed. However, these characteristics are caused to occur significantly by removing the deposited layers 12.

The expanded carbon fiber product may be used as a material for carbon intercalation compounds in which various types of compounds are intercalated into the gaps between the opened hexagonal carbon layers.

The expanded carbon fiber product may be used for various types of applications such as an anode material or additive to the anode material of primary and secondary lithium batteries, or members of fuel cells (high-polymer electrolyte membrane, catalyst support, separator, and the like).

The exposed edges of the hexagonal carbon layers 10 of the expanded carbon fiber product having the above properties are easily bond to other atoms due to an extremely high activity.

Since the carbon fiber is not graphitized, the expanded carbon fiber product may be effectively used as an anode material or an additive to the anode material of a lithium ion battery.

Conventionally, graphite materials have been used as the anode material of the lithium ion battery. However, when lithium ions are doped between layers of the graphite materials, the anode material expands due to an increase in the gaps between the layers. If the charge and discharge cycles are repeated in such a state, the electrode may be deformed or lithium metal may be deposited, thereby causing capacitance degradation or internal short circuits. Moreover, if the gaps between layers are increased and contracted repeatedly, the graphite crystal structure may be damaged, whereby the cycle characteristics may be adversely affected.

On the contrary, the carbon fiber product which is scarcely graphitized has a larger gaps between the AB planes than the graphite material and shows neither expansion nor deformation between layers after doping with lithium ions, thereby exhibiting extremely excellent cycle characteristics. Moreover, the carbon fiber has an improved electrical energy density in comparison with the graphite material.

What is claimed is:

1. An expanded stacked cup carbon nanofiber product comprising a vapor grown coaxial stacking morphology of truncated conical tubular graphene layers,
    wherein each of the truncated conical tubular graphene layers includes a hexagonal carbon layer and has a large ring end at one end and a small ring end at the other end in an axial direction,
    wherein at least part of edges of the hexagonal carbon layers are exposed at the large ring ends,
    wherein the stacked cup carbon nanofiber has a round cross-section,
    wherein a plurality of gaps between the hexagonal carbon layers is larger than the gaps between the hexagonal carbon layers at the time of vapor growth due to an expansion treatment applied to the carbon fibers, and
    wherein the plurality of gaps between the hexagonal carbon layers after expansion treatment are about 100 to about 1000 times larger than the gaps between the hexagonal carbon layers prior to expansion treatment, and the gaps between the hexagonal carbon layers prior to treatment are about 3 Å to about 4 Å.

2. The expanded stacked cup carbon nanofiber product as defined in claim 1, having a bulk density of 0.010 g/cm$^3$ or less.

3. The expanded stacked cup carbon nanofiber product as defined in claim 1, wherein two to several tens of thousands of the hexagonal carbon layers are stacked.

4. The expanded stacked cup carbon nanofiber product as defined in claim 1, wherein catalytic metal is supported on the exposed edges of the hexagonal carbon layers.

5. The expanded stacked cup carbon nanofiber product as defined in claim 1, wherein at least part of the hexagonal carbon layers is exposed at the small ring ends.

6. The expanded stacked cup carbon nanofiber product as defined in claim 5, wherein the catalytic metal is supported on the exposed edges of the hexagonal carbon layers.

7. The expanded stacked cup carbon nanofiber product as defined in claim 1, wherein the expansion treatment occurs at temperatures of 500° C. to 700° C.

8. A composite comprising a base material with which the expanded stacked cup carbon nanofiber product as defined in claim 1 is mixed in.

9. The composite as defined in claim 8, wherein the base material is resin.

10. The composite as defined in claim 8, wherein the base material is metal.

* * * * *